(12) United States Patent
Gotoh

(10) Patent No.: US 8,978,379 B2
(45) Date of Patent: Mar. 17, 2015

(54) ELECTRONICALLY CONTROLLED ACTUATOR

(75) Inventor: Takashi Gotoh, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 75 days.

(21) Appl. No.: 13/643,921

(22) PCT Filed: Aug. 20, 2010

(86) PCT No.: PCT/JP2010/005147
§ 371 (c)(1),
(2), (4) Date: Oct. 26, 2012

(87) PCT Pub. No.: WO2012/023160
PCT Pub. Date: Feb. 23, 2012

(65) Prior Publication Data
US 2013/0049502 A1   Feb. 28, 2013

(51) Int. Cl.
| F02D 23/00 | (2006.01) |
| H02K 7/06 | (2006.01) |
| F01D 17/12 | (2006.01) |
| G05B 5/00 | (2006.01) |
| F02B 37/24 | (2006.01) |
| F02B 37/18 | (2006.01) |

(52) U.S. Cl.
CPC ............... *F02B 37/24* (2013.01); *F02B 37/186* (2013.01); *Y02T 10/144* (2013.01)
USPC ................ 60/602; 310/80; 415/150; 318/466

(58) Field of Classification Search
CPC .......... F02B 37/12; F02B 37/22; F02B 37/24; F02B 37/186; Y02T 10/144; G05G 5/05; H02K 7/06; F16H 25/20; F16H 2025/2075

USPC ................ 60/602; 318/466; 415/150; 310/80
See application file for complete search history.

(56) References Cited

U.S. PATENT DOCUMENTS

| 3,921,264 | A | * | 11/1975 | Madonian et al. ............ 475/154 |
| 6,105,743 | A | * | 8/2000 | Salecker et al. ............. 192/84.6 |
| 6,155,126 | A | * | 12/2000 | Vogt et al. ........................ 74/335 |
| 6,244,565 | B1 | * | 6/2001 | McDonnell et al. ...... 251/129.12 |
| 6,435,169 | B1 | * | 8/2002 | Vogt ................................. 60/602 |
| 8,074,622 | B2 | * | 12/2011 | Telep et al. ................... 123/399 |
| 8,862,353 | B2 | * | 10/2014 | Reuschel ......................... 701/68 |
| 2002/0184760 | A1 | | 12/2002 | Babin et al. |
| 2003/0024338 | A1 | * | 2/2003 | Roither et al. .................. 74/425 |
| 2003/0185672 | A1 | * | 10/2003 | Suganami et al. ............. 415/150 |
| 2003/0201742 | A1 | * | 10/2003 | Pringle et al. ................. 318/466 |

(Continued)

FOREIGN PATENT DOCUMENTS

| DE | 102006046451 A1 | 4/2007 |
| JP | 6-25641 U | 4/1994 |

(Continued)

OTHER PUBLICATIONS

Translation of JP 2002-349641, Apr. 1, 2014.*

*Primary Examiner* — Thai Ba Trieu
*Assistant Examiner* — Jason T Newton
(74) *Attorney, Agent, or Firm* — Birch, Stewart, Kolasch & Birch, LLP

(57) ABSTRACT

The base of an actuator housing 10 is arranged to face the side of a turbine housing, and a motor 16 is fixed to a motor support post that is protrusively provided toward the top of the actuator housing 10 such that the motor 16 is kept at a distance from the turbine housing.

3 Claims, 6 Drawing Sheets

(56) References Cited

U.S. PATENT DOCUMENTS

| | | | |
|---|---|---|---|
| 2004/0187495 A1* | 9/2004 | Ando et al. | 60/602 |
| 2005/0109315 A1* | 5/2005 | Kamimura et al. | 123/399 |
| 2007/0084439 A1 | 4/2007 | Isogai et al. | |
| 2008/0099707 A1 | 5/2008 | Yoshika et al. | |
| 2012/0124993 A1* | 5/2012 | Kim | 60/602 |
| 2013/0291539 A1* | 11/2013 | Koch et al. | 60/602 |

FOREIGN PATENT DOCUMENTS

| | | |
|---|---|---|
| JP | 2002-35241 A | 2/2002 |
| JP | 2002-349641 A | 12/2002 |
| JP | 2004-251203 A | 9/2004 |
| JP | 2005-180456 A | 7/2005 |
| JP | 2008-115702 A | 5/2008 |

* cited by examiner

ELECTRONICALLY CONTROLLED ACTUATOR

TECHNICAL FIELD

The present invention relates to an electronically controlled actuator for driving opening and closing of nozzle vanes of a turbo charger.

BACKGROUND ART

In a turbo charger in which a turbine is rotated by the exhaust gas from an engine and air is supplied to the engine after being compressed by a compressor arranged on the same axis with the turbine, an electronically controlled actuator drives opening and closing of nozzle vanes mounted on a turbine nozzle to adjust the turbo-charging pressure of the compressor.

FIG. 7 is a cross-sectional view showing the configuration of a conventional electronically controlled actuator 100 arranged around a turbo charger. In the turbo charger, an intake-side compressor housing 2 and an exhaust-side turbine housing 3 are arranged to face each other, while a compressor and turbine housed therein are arranged on the same axis. This axis is arranged within a bearing housing 4 which links the compressor housing 2 and the turbine housing 3. In the conventional electronically controlled actuator 100, a motor 101 is arranged at a position close to the turbine housing 3, and a motor shaft 102, a pinion gear 103 coupled with the motor shaft 102 and a plurality of gears 104, 105 are arranged on the side of the compressor housing 2 to thus transmit the rotation driving force of the motor 101 to the shaft 106. Then, the end portion of the shaft 106 is led out toward the turbine housing 3 and connected to nozzle vanes (not shown) within the turbine housing 3. This configuration has a drawback that the temperature of the motor is increased by receiving the radiation heat from the turbine housing 3 heated by the exhaust gas of the engine, which shorten remarkably the lifetime of the motor and hence the lifetime of the actuator. For this reason, it is necessary that a part of the motor 101 facing the turbine housing 3 be covered with a heat shield 107 to protect the motor 101 against the radiation heat.

In addition, in order to protect the electronically controlled actuator against the heat, for example, in Patent Document 1, the part of the electronically controlled actuator exposed from the engine is arranged at a position displaced in a direction of vehicle width from a heat generator arranged around the engine so as to prevent the actuator from being exposed to the heat.

Further, in an electronically controlled actuator according to Patent Document 2, for example, a unit cover for housing a motor control board, a motor casing for housing a motor, and an actuator cover for housing a reduction gear mechanism composed of a pinion gear and a plurality of reduction gears are formed separately, while the unit cover and the actuator are made of an aluminum alloy for protection against heat.

PRIOR ART DOCUMENTS

Patent Documents

Patent Document 1: Japanese Patent Application Publication No. 2008-115702
Patent Document 2: Japanese Patent Application Publication No. 2004-251203

SUMMARY OF THE INVENTION

However, Patent Document 1 does not refer to a arranged position of the motor which is especially susceptible to heat among the elements of the electronically controlled actuator, and therefore, the temperature of the motor may rise depending on the arranged position of the motor to shorten remarkably the lifetime of the motor.

On the other hand, Patent Document 2 does not refer to a positional relationship between the turbine housing subjected to a high temperature and the electronically controlled actuator, and therefore, the temperature of the motor may rise depending on the arranged position of the electronically controlled actuator to shorten remarkably the lifetime of the motor. In addition, due to a configuration in which the control board, the motor, and the reduction gear mechanism are housed individually in separate housings, and these housings are fastened with screws to be integrated, there is also a problem such that the configuration is complicated and has a great number of parts, which takes time in the assembly.

The present invention has been made to solve the aforementioned problems, and an object of the invention is to provide an electronically controlled actuator that reduces the radiation heat from a turbo charger to a motor and improves the assemblability by an efficient arrangement of parts.

An electronically controlled actuator of the invention includes: an actuator housing that has a top-opened shape and that is attached to a compressor housing arranged at a position to face the turbine housing; a motor support post protrusively provided on the actuator housing toward the open side thereof; a motor that is supported by the motor support post in a state in which a motor shaft having a fixed pinion gear is directed toward the base side of the actuator housing; a shaft having a shape such that an end portion thereof projects to the outside with passing through the base of the actuator housing, and which is rotatably supported by the actuator housing; an output gear that transmits rotation driving force of the motor shaft via the pinion gear to rotate the shaft; a lever one end of which is connected to the end portion of the shaft and the other end of which is connected to the nozzle vanes to drive opening and closing of the nozzle vanes in response to a rotation of the shaft; and a cover that is attached to the actuator housing with the motor support post as a guide and that covers an open section thereof.

According to the invention, the following electronically controlled actuator can be provided: when the motor is arranged on the open top side of the actuator housing attached to the compressor housing, the motor can be located away from the turbine housing, so that the radiation heat from the turbo charger can be reduced, and also the attachment of the cover is guided with the motor support post to improve the assemblability.

BEST MODE FOR CARRYING OUT THE INVENTION

In the following, embodiments of the present invention will now be described with reference to the accompanying drawings in order to explain the present invention in more detail.
Embodiment 1

Figure 1:
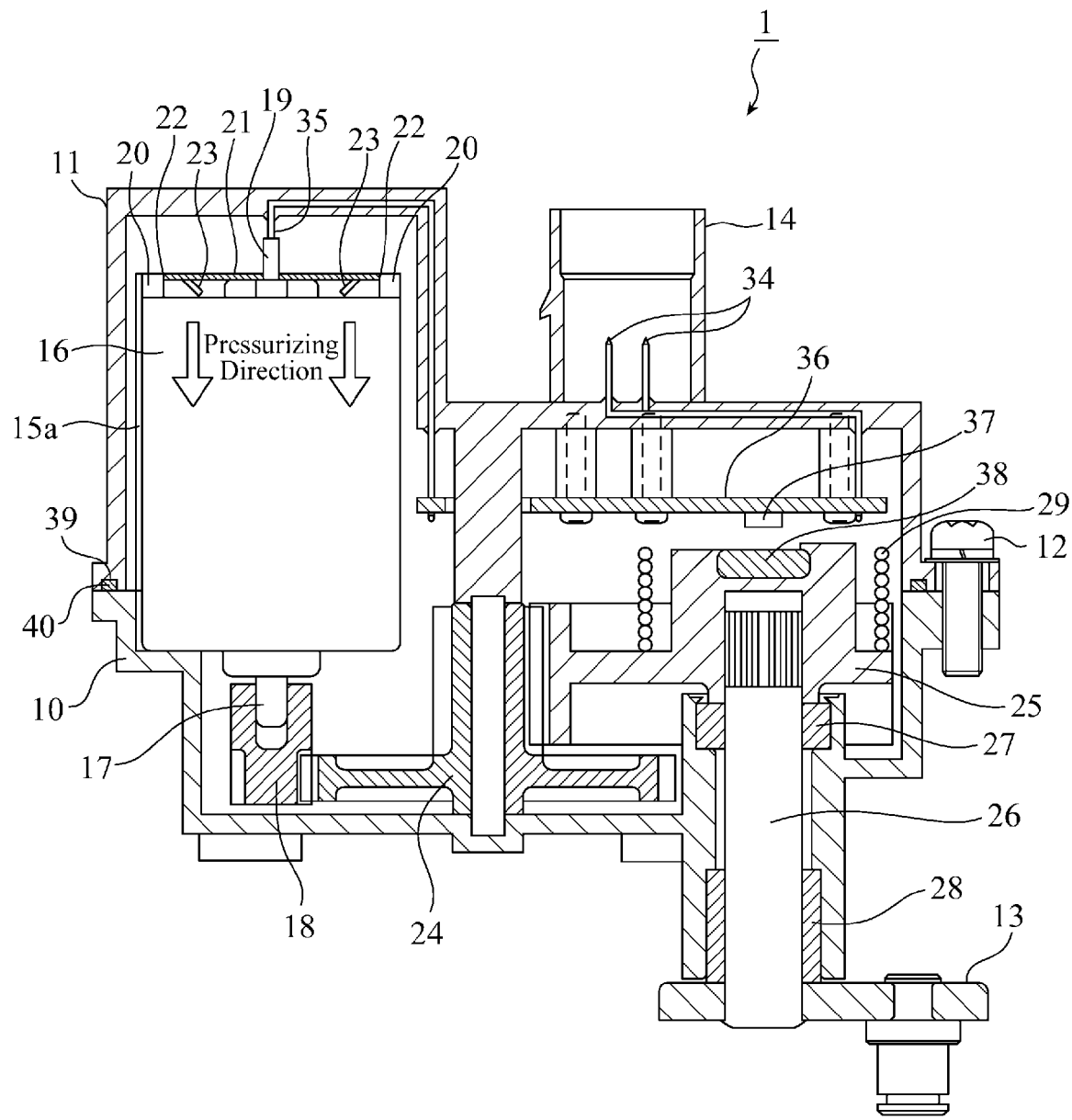
FIG. 1 is a cross-sectional view showing the configuration of an electronically controlled actuator according to Embodiment 1 of the present invention.
Figure 2:
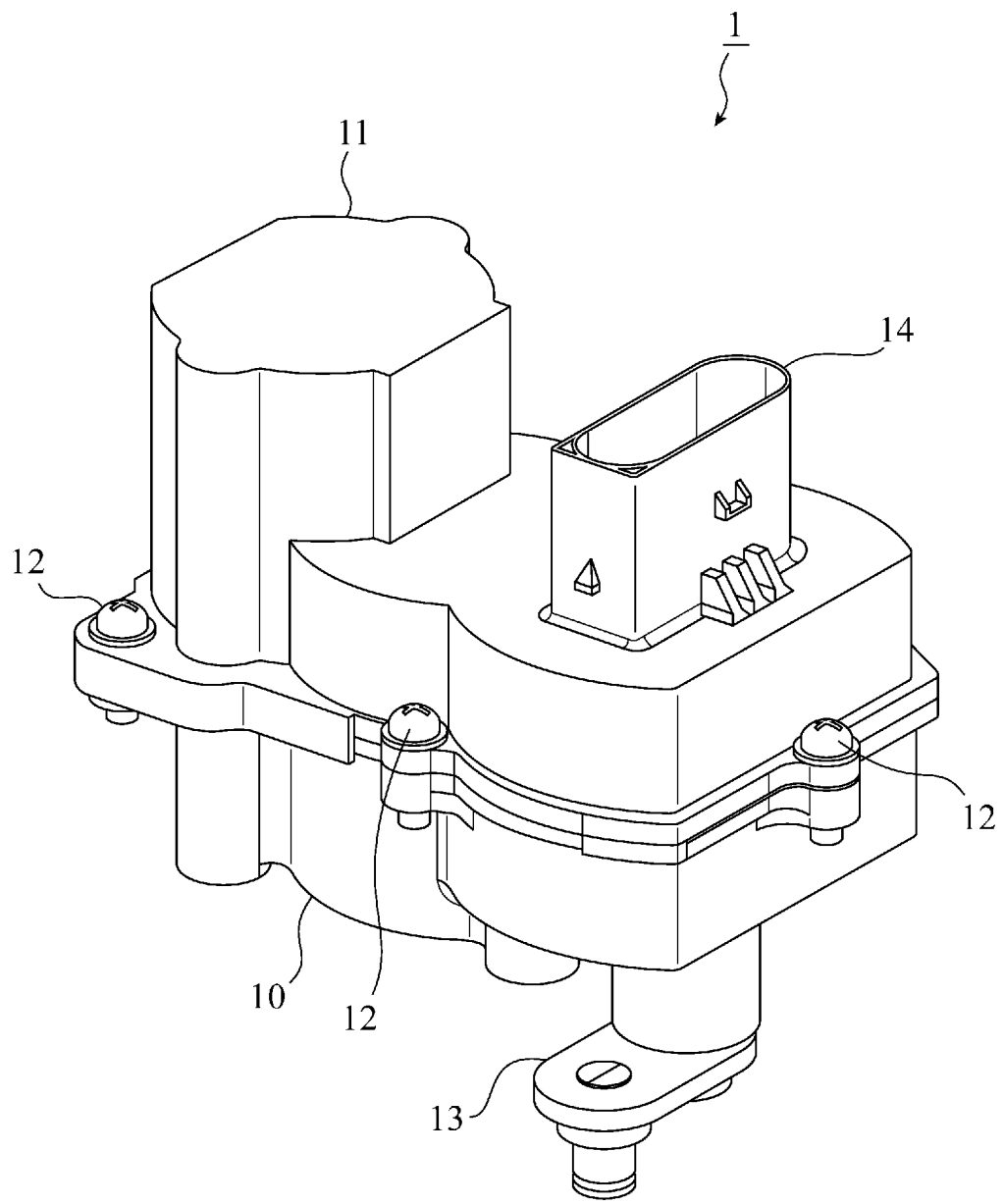
FIG. 2 is an outside perspective view showing the configuration of the electronically controlled actuator according to Embodiment 1.
Figure 3:
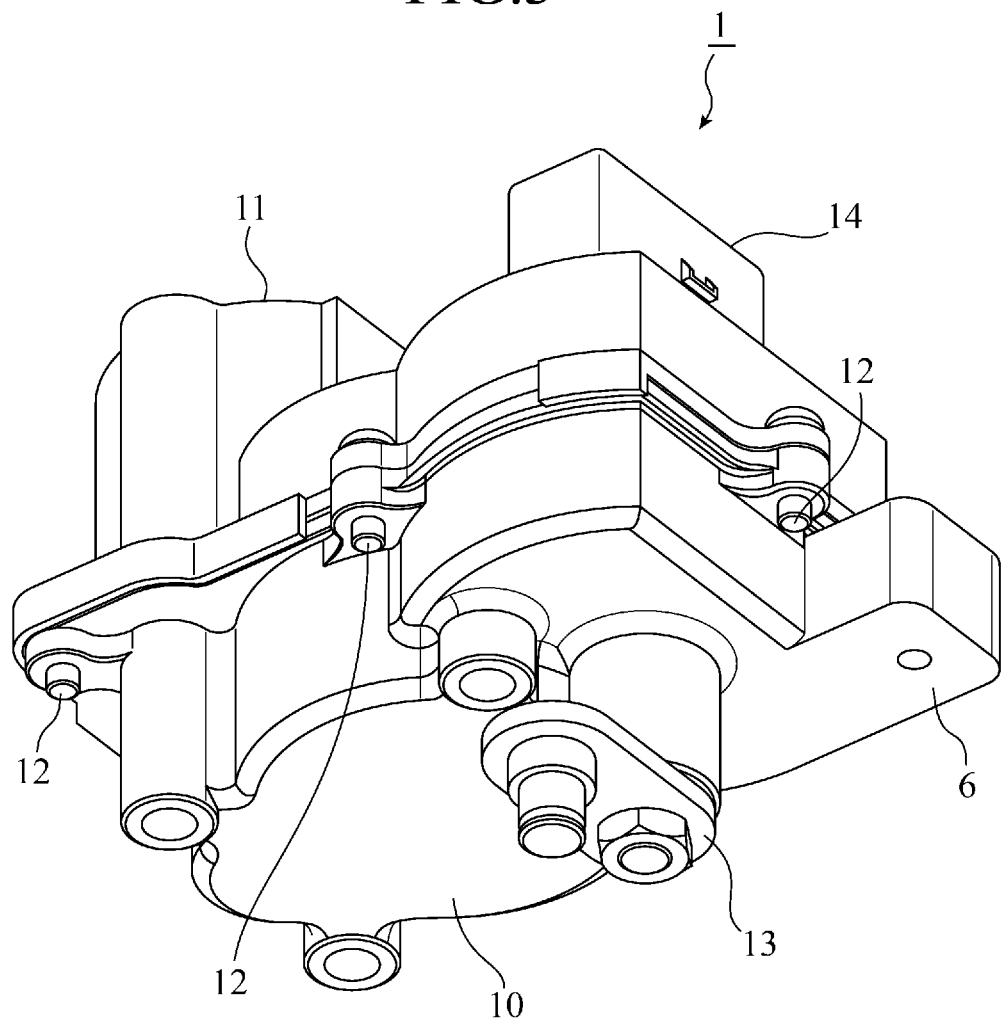
FIG. 3 is an outside perspective view showing the configuration of the electronically controlled actuator according to Embodiment 1.

As shown in FIGS. 1 to 3, an electronically controlled actuator 1 is composed of an actuator housing 10 made of an aluminum alloy and a resin-made cover 11 made of a resin to be fastened with a plurality of screws 12. A lever 13 is provided on the base side of the actuator housing 10 and the lever 13 is connected to nozzle vanes (not shown).

Figure 4:
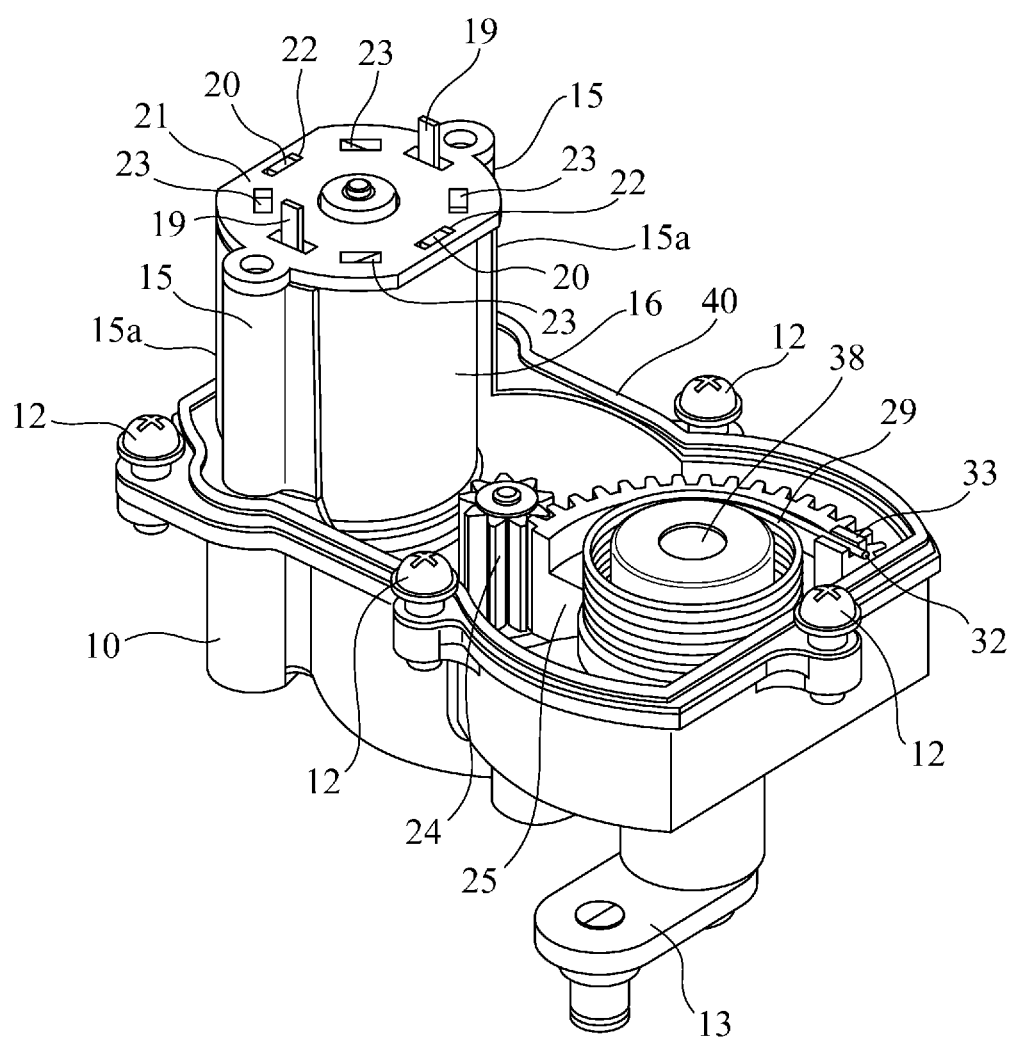
FIG. 4 is a perspective view showing a state of the electronically controlled actuator according to Embodiment 1 before attachment of a cover.
Figure 5:
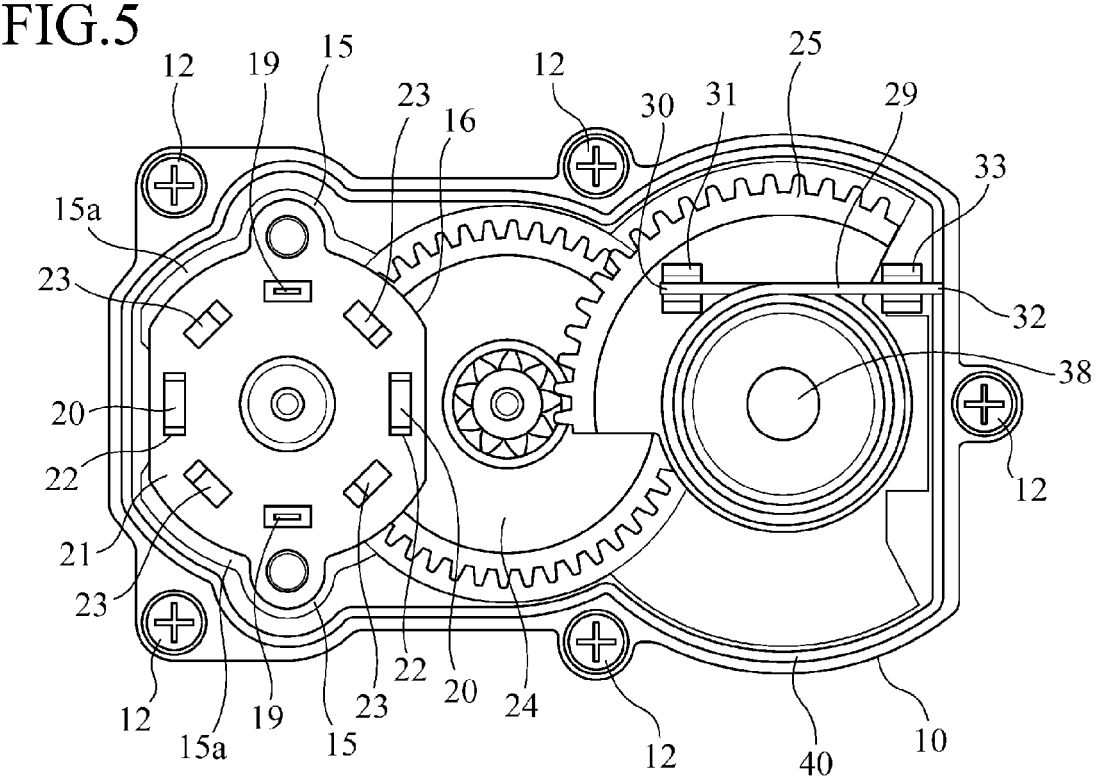
FIG. 5 is a plan view showing the state of the electronically controlled actuator according to Embodiment 1 before attachment of the cover.

FIGS. 4 and 5 show states of the electronically controlled actuator 1 from which the cover 11 is removed. As shown in FIGS. 1, 4 and 5, the actuator housing 10 is composed of the base and side peripheral walls, while the top thereof is open. Motor support posts 15, 15 are protrusively provided in the actuator housing 10 toward the open top side, and also motor support faces 15a, 15a are formed on the opposite sides of each of the motor support posts 15, 15. The motor 16 is inserted thereinto, and the motor 16 is supported by the motor support posts 15, 15 and the motor support faces 15a on the opposite sides. A motor shaft 17 projects from the face of the motor 16 facing the base of the actuator housing 10 when the motor 16 is inserted into the motor support posts 15, and a pinion gear 18 is attached to the motor shaft 17. Terminals 19, 19 connected to a coil within the motor 16 are led out from the top surface of the motor 16, and anti-rotation projections 20, 20 are protrusively provided on the top surface. It is noted that three or more of the motor support post 15 may be provided to support the motor 16 to omit the motor support face 15a. The motor support posts 15, 15 and the motor support faces 15a, 15a are formed such that the actuator housing 10 is processed.

A plate 21 is arranged on the top surface of the motor 16, and the plate 21 is fastened with screws to the ends of the motor support posts 15, 15, so that the motor 16 is fixed to the actuator housing 10. The plate 21 is provided with holes for passing the terminals 19, 19 of the motor 16, and anti-rotation recesses 22, 22 (holes in the illustrated example) to be engaged with the anti-rotation projections 20, 20. The engagement between the anti-rotation projections 20, 20 and the anti-rotation recesses 22, 22 prevents the main body of the motor 16 from rotating when the motor shaft 17 rotates the pinion gear 18. It is noted that the anti-rotation projections may be formed in the motor 16, and the anti-rotation recesses may be formed in the plate 21.

Further, a part of the plate 21 is subjected to lancing, to thus prepare four pressurizing pawls 23 for ensuring vibration resistance of the motor 16. In the illustrated example, though the four pressurizing pawls 23 are formed, any number of the pawls may be provided. Since the pressurizing pawls 23 of the plate 21 pressurize the motor 16 toward the actuator housing 10, the vibration of the motor 16 is prevented in the case where the vehicle is vibrated.

Figure 7:
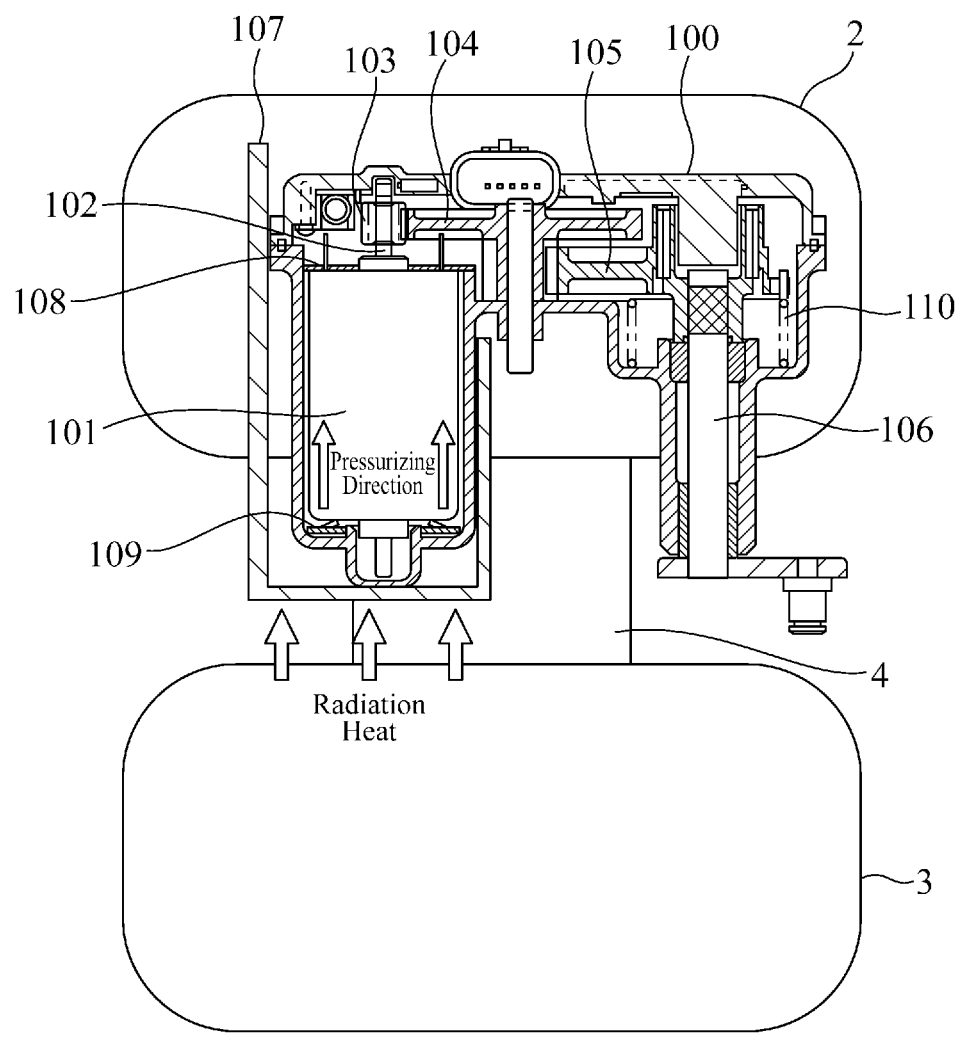
FIG. 7 is a cross-sectional view showing the configuration of a conventional electronically controlled actuator.

In contrast, in the conventional electronically controlled actuator 100 as shown in FIG. 7, a pressurizing washer 109 is provided separately from a plate 108 for fixing the motor 101; this pressurizing washer 109 pressurizes the motor 101 toward the plate 108 to ensure the vibration resistance of the motor 101. In the past, the plate 108 and the pressurizing washer 109 are separately provided, while in the present Embodiment 1, an anti-rotation function (anti-rotation projections 20, 20) and a pressurizing function (pressurizing pawls 23) are provided for the plate 21, which makes it possible to reduce the number of components. Further, as will be described in detail later, according to the configuration of the present Embodiment 1, since the pressurizing pawls 23 are arranged at positions away from the turbine housing, an increase of the temperature is suppressed and hence an occurrence of creep is suppressed. Thus, the deformation of the pressurizing pawls 23 due to the creep can be prevented; there is also an advantage such that the vibration resistance of the motor 16 can be maintained for a long period of time.

As shown in FIGS. 1, 4 and 5, in addition to the motor 16, housed within the actuator housing 10 are a circular intermediate gear 24 for rotating in engagement with the pinion gear 18, a sectorial output gear 25 for rotating in engagement with the intermediate gear 24, and a shaft 26 for rotating integrally with connected to the output gear 25. One end of the shaft 26 is connected to the output gear 25, while the other end passes through the base of the actuator housing 10 to be projected to the outside, and is connected to the lever 13. The shaft 26 is supported rotatably by both bearing units of a bush 27 and a bearing 28 which are fixed to the actuator housing 10. Although in the illustrated example, it is configured that three gears consisting of the pinion gear 18, the intermediate gear 24, and the output gear 25 are used, any other configuration can be employed as long as it is configured that the rotation driving force of the motor shaft 17 can be transmitted to the shaft 26.

A spring 29 is assembled on the top surface of the output gear 25 to normally urges the shaft 26 together with the output gear 25 to a predetermined direction. In assembly, one end 30 of the spring 29 is locked in a holding part 31 formed on the output gear 25, and the other end 32 is locked in a holding part 33 formed on the actuator housing 10 while rotating the spring 29 to give it an initial torque (i.e., urging force to normally urge the shaft 26 in a predetermined direction). Thus, since the spring 29 is attached to the top surface of the output gear 25, workability of the worker can be improved and a proper installment thereof can be visually checked.

In contrast, the conventional electronically controlled actuator 100 shown in FIG. 7 has a configuration such that a spring 110 is assembled to the back surface of the gear 105. In assembly, the opposite ends of the spring 110 each are subjected to bending; one end subjected to bending is hooked on a projection formed on the back surface of the gear 105, and the other end subjected to bending similarly is hooked on a projection formed on the actuator housing with rotating the gear 105 and spring 110 together to give the spring an initial torque. Thus, since the spring 110 is assembled to the back surface of the gear 105, the worker cannot visually check the installment, and the workability is poor. In addition, upon application of an initial torque thereto, the gear 105 has to be rotated together with the spring 110, which deteriorates the assemblability. Furthermore, the spring 29 according to the present Embodiment 1 can be attached to the holding parts 31, 33 without bending as it is, while in the past, it is necessary that a processing such as bending is applied to the spring 110.

As shown in FIGS. 1, 4 and 5, after the motor 16, the plate 21, the pinion gear 18, the intermediate gear 24, the output gear 25, the shaft 26, the bush 27, the bearing 28, the spring 29 and other components are assembled within the actuator housing 10, the cover 11 is inserted with the motor support posts 15, 15 as a guide to cover the open side of the actuator housing 10. The cover 11 and the actuator housing 10 are fastened with a plurality of screws 12.

As shown in FIG. 1, the cover 11 is integrally formed of a connector 14, a connector terminal 34, and a motor terminal 35, and a substrate 36 is attached inside the cover. The connector terminal 34 and the substrate 36 are electrically connected to each other, and the substrate 36 and the motor terminal 35 are also electrically connected to each other. A sensor IC 37 is mounted on the side of the substrate 36 facing the shaft 26 to detect a direction of a magnetic field of a magnet 38 attached to a position on the top of the shaft 26 facing the sensor IC 37 to thus obtain a rotation angle of the shaft 26. A groove 39 is formed on the joint surface of the cover 11 with the actuator housing 10, and a seal member 40 is fit in the groove.

Figure 6:
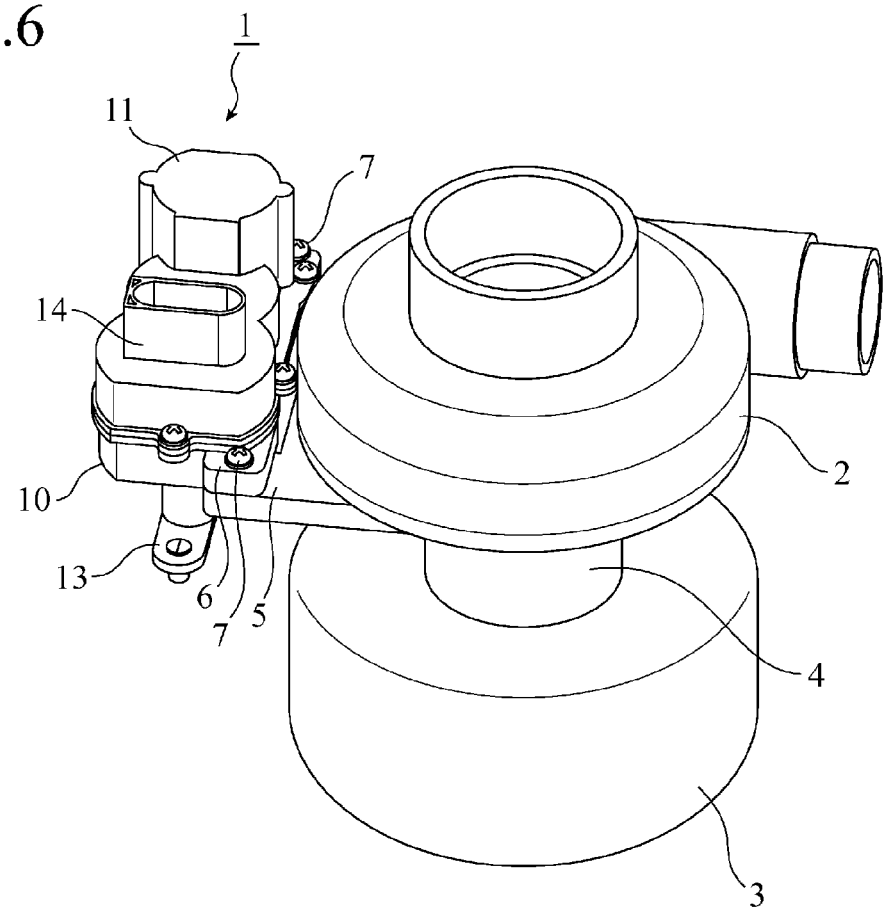
FIG. 6 is an outside perspective view showing the configuration in which the electronically controlled actuator according to Embodiment 1 is attached to a turbo charger.

FIG. 6 is an outside perspective view showing the electronically controlled actuator 1 according to Embodiment 1 attached to a turbo charger. Similarly to FIG. 7, the turbo charger has a configuration such that the compressor housing 2 and the turbine housing 3 facing each other are joined by the bearing housing 4. The actuator housing 10 of the electronically controlled actuator 1 is attached to the compressor housing 2. This attachment can be done by any method. For example, the compressor housing 2 is provided with a rib 5, the electronically controlled actuator 1 is also provided with a rib 6, and these ribs 5, 6 are fastened to each other with screws 7, 7. FIG. 3 shows a structure in which the rib 6 illustrated in FIG. 6 is viewed from the base side. The rib 6 has a convex shape such that the actuator housing 10 is processed, and is provided with a threaded hole for fastening the screw 7.

In a variable-nozzle-type turbo charger, in general, nozzle vanes are arranged in a turbine nozzle housed in the turbine housing 3, and a link plate for continuously driving the nozzle vanes between open and close positions is attached thereto. Therefore, the nozzle vanes are opening/closing driven, when the lever 13 of the electronically controlled actuator 1 attached to the compressor housing 2 is connected to the link plate, and the lever 13 is subjected to a turning operation.

The turbine housing 3 through which the exhaust gas from the engine flows through is brought to a high temperature; thus, in order to protect against the radiation heat, the motor 16 is arranged on the upper open side of the actuator housing 10 to be structurally spaced away from the turbine housing 3, which enables to prolong the lifetime of the motor 16 and hence the lifetime of the electronically controlled actuator 1. Further, since the motor 16 is not significantly affected by heat, internal components of the motor 16 can be composed of those with low heat resistance. Although in the conventional electronically controlled actuator 100 shown in FIG. 7, the heat shield 107 is provided in order to protect the motor 101 against the radiation heat, the heat shield can be omitted in the electronically controlled actuator 1 according to the present Embodiment 1 since the effect of the radiation heat is not significant.

Next, an operation of the electronically controlled actuator 1 will be described.

In the turbo charger, upon a low speed (low RPM) in the engine, the lever 13 of the electronically controlled actuator 1 is driven to a direction of closing the nozzle vanes, whereas upon a high speed (high RPM) in the engine, the lever 13 is driven to a direction of opening the nozzle vanes, so that an appropriate turbocharging pressure is generated. A not-shown control device (e.g. engine control unit) outputs a control signal according to an engine speed (RPM) and so on to the electronically controlled actuator 1.

In the electronically controlled actuator 1, when the connector terminal 34 externally receives the control signal according to the engine speed, electrical power is supplied from the motor terminal 35 to the coil terminals 19 via the substrate 36 to rotation-drive the motor 16 in a direction according to the control signal. When the motor shaft 17 is rotated by rotation driving force of the motor 16, the pinion gear 18 is also rotated integrally therewith, and the intermediate gear 24 and output gear 25 engaging with the pinion gear 18 are also rotated. Then, the rotation driving force of the motor 16 is transmitted to the shaft 26, and the lever 13 coupled to the end portion of the shaft 26 is rotated to drive the nozzle vanes to the opening or closing direction.

At this point, since the spring 29 urges the output gear 25, the shaft 26 united with the output gear 25 can be rotated without backlash. When the nozzle vanes cannot be opened or closed due to the failure of the motor 16 or the like, the shaft 26 is rotated by the urging force of the spring 29 to drive the nozzle vanes in the closing direction, thereby preventing an abnormal increase of the turbocharging pressure.

As described above, the electronically controlled actuator 1 according to the Embodiment 1 is configured to include: the actuator housing 10 that has a top-opened shape and that is attached to the compressor housing 2 arranged at a position to face the turbine housing 3; the motor support posts 15 protrusively provided on the actuator housing 10 toward the open side thereof; the motor 16 supported by the motor support posts 15 in a state in which the motor shaft 17 having the fixed pinion gear 18 is directed toward the base side of the actuator housing 10; the shaft 26 having a shape such that an end thereof projects to the outside with passing through the base of the actuator housing 10, and which is rotatably supported by the actuator housing 10; the output gear 25 that transmits the rotation driving force of the motor shaft 17 via the pinion gear 18 and the intermediate gear 24 to rotate the shaft 26; the lever 13 one end of which is connected to the end portion of the shaft 26 and the other end of which is connected to nozzle vanes to drive opening and closing of the nozzle vanes according to the rotation of the shaft 26; and the cover 11 that is attached to the actuator housing 10 with the motor support posts 15 as a guide and that covers an open section thereof. Therefore, when the motor 16 is arranged on the open top side of the actuator housing 10, the motor 16 can be located at a position away from the turbine housing 3, and thereby the radiation heat from the turbine housing 3 can be reduced. Further, upon attachment of the cover 11, the insertion of the cover 11 is guided with the motor support posts 15, thereby improving the assemblability.

According to the Embodiment 1, it is configured to have the plate 21 attached on the top surface of the motor 16 and fixed to the motor support posts 15, and the pressurizing pawls 23 for pressurizing the motor 16 toward the actuator housing 10 such that a part of the plate 21 is subjected to lancing, which enables to reduce the number of components.

Further, according to the Embodiment 1, it is configured to have the spring 29, assembled to the top surface of the output gear 25, for urging the output gear 25 and rotating the shaft 26, which enables to improve the assemblability of the spring 29.

INDUSTRIAL APPLICABILITY

As described above, the electronically controlled actuator of the present invention is suitable for use in a variable-nozzle-type turbo charger or the like, since it is designed to reduce the radiation heat from the turbine housing.

The invention claimed is:
1. An electronically controlled actuator for driving opening and closing of nozzle vanes provided in a turbine housing of a turbo charger, the electronically controlled actuator comprising:

an actuator housing that is shaped so as to include an opening on top, the actuator housing being attached to a compressor housing and for housing the driving mechanism of the actuator, the compressor housing being arranged at a position to face the turbine housing;

a motor support post provided on the actuator housing protruding from the opening;

a motor that is supported by the motor support post in a state in which a motor shaft having a fixed pinion gear is directed toward a bottom of the actuator housing;

a shaft partially disposed within the actuator housing such that an end portion thereof projects outside the actuator housing through the bottom of the actuator housing, and which is rotatably supported by the actuator housing;

an output gear that transmits rotation driving force of the motor shaft via the fixed pinion gear to rotate the shaft;

a lever one end of which is connected to the end portion of the shaft and the other end of which is connected to the nozzle vanes to drive opening and closing of the nozzle vanes in response to a rotation of the shaft; and a cover that is attached to the actuator housing with the motor support post as a guide and that covers the opening.

2. The electronically controlled actuator according to claim 1, comprising:

a plate that is arranged on the top surface of the motor and fixed to the motor support post; and a pawl that is formed on a part of the plate, the pawl pressurizing the motor toward the actuator housing.

3. The electronically controlled actuator according to claim 1, comprising a spring that is assembled to the top surface of the output gear, the spring exerting a force urging the output gear in a direction to rotate the shaft.

* * * * *